US007218044B2

(12) United States Patent
Kim et al.

(10) Patent No.: US 7,218,044 B2
(45) Date of Patent: May 15, 2007

(54) FRONT FILTER IN PLASMA DISPLAY PANEL

(75) Inventors: Kyung Ku Kim, Seoul (KR); Hong Rae Cha, Seoul (KR); Young Sung Kim, Yongin-si (KR); Myeong Soo Chang, Woowang-si (KR); Byung Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 10/778,462

(22) Filed: Feb. 12, 2004

(65) Prior Publication Data

US 2004/0164661 A1 Aug. 26, 2004

(30) Foreign Application Priority Data

Feb. 12, 2003 (KR) ..................... 10-2003-0008838

(51) Int. Cl.
*H01J 5/16* (2006.01)
*H01J 61/40* (2006.01)
*H01J 17/49* (2006.01)
*B32B 17/06* (2006.01)
*G02B 5/08* (2006.01)

(52) U.S. Cl. ...................... 313/112; 313/582; 313/110; 428/426; 359/359

(58) Field of Classification Search ........ 313/110–113, 313/489, 582; 428/426; 359/350, 359
See application file for complete search history.

(56) References Cited

U.S. PATENT DOCUMENTS 6,255,031 B1 * 7/2001 Yao et al. ................ 430/270.1
6,316,110 B1 * 11/2001 Anzaki et al. .............. 359/359
6,579,423 B2 * 6/2003 Anzaki et al. ......... 204/192.16
6,888,301 B1 * 5/2005 Namiki et al. .............. 313/489
6,991,849 B2 * 1/2006 Oya ........................... 428/482
7,119,858 B2 * 10/2006 Kim et al. .................. 313/582
7,138,173 B2 * 11/2006 Wheatley et al. ........... 428/212
2001/0019236 A1 * 9/2001 Hirota et al. ............... 313/110
2004/0232813 A1 * 11/2004 Nakano et al. ............. 313/112
2006/0159936 A1 * 7/2006 Chang et al. ............... 428/447

* cited by examiner

*Primary Examiner*—Nimeshkumar D. Patel
*Assistant Examiner*—Peter Macchiarolo
(74) *Attorney, Agent, or Firm*—Lee, Hong, Degerman Kang & Schmadeka

(57) ABSTRACT

Disclosed is a front filter attached to a front surface of a plasma display panel, the front filter comprising: an antireflection coating for preventing reflection of incident light from outside; an optical characteristic film for improving optical characteristics of incident light from the panel, by decreasing brightnesses of red (R) and green (G) rays and by increasing brightness of blue (B) rays; an EMI shielding film for shielding emission of electromagnetic wave; and an NIR blocking film for blocking near infrared rays emitted from the panel, wherein, transmittance of emitted light from the plasma display panel when the emitted light transmits the antireflection coating, the optical characteristic film, the EMI shielding film, and the NIR blocking film is determined in dependence of wavelength of the emitted light, and wherein transmittance of B rays at a wavelength of 454 nm is 50–80%, transmittance of G rays at a wavelength of 525 nm is 40–80%, transmittance of orange rays at a wavelength of 580–592 nm is 5–30%, transmittance of R rays at a wavelength of 610–630 nm is 50–80%, and transmittance of NIR at a wavelength of 850–950 nm is 1–10%.

18 Claims, 6 Drawing Sheets

FRONT FILTER IN PLASMA DISPLAY PANEL

CROSS-REFERENCE TO RELATED APPLICATIONS

Pursuant to 35 U.S.C. § 119(a), this application claims the benefit of earlier filing date and right of priority to Korean Application No. 8838/2003, filed on Feb. 12, 2003, the contents of which are hereby incorporated by reference herein in their entirety.

BACKGROUND OF THE INVENTION

1. Field of the Invention

The present invention relates in general to a plasma display panel, more particularly, to a front panel attached to a front surface of the plasma display panel.

2. Discussion of the Background Art

Principle of plasma display panel displays (hereinafter referred to as PDP) technology is that 147 nm-ultraviolet rays generated by discharge of different compositions of inert gas mixtures, such as, He+Xe, Ne+Xe or He+Ne+Xe, irradiate phosphors emitting in either red, green, or blue to display images including characters or graphics. The PDP technology is at mass production stage, and recent advances in PDP technologies made easier to manufacture thin PDPs and to provide much improved picture quality. Especially, in case of a three-electrode surface discharge type PDP, charge particles formed by discharge (i.e. wall charge) are stacked on the surface, which in turn protect electrodes from sputtering originated by discharge. Thus, the three-electrode surface discharge type PDP is known for low consumption of voltage and long lifespan.

FIG. 1 is a perspective view of the structure of a discharge cell in a related art PDP.

Referring to FIG. 1, the discharge cell of the related art PDP adopting the three-electrode surface discharge type structure includes a scan electrode (Y) and a sustain electrode (Z) formed on an upper substrate 10, and an address electrode (X) formed on a lower substrate 18. The scan electrode (Y) and the sustain electrode (Z) respectively includes transparent electrodes (12Y and 12Z), and metal bus electrodes (13Y and 13Z) formed on an edge of the transparent electrodes (12Y and 12Z) and having a smaller line width than that of the transparent electrodes (12Y and 12Z).

In general, the transparent electrodes (12Y and 12Z) are composed of Indium-Tin-Oxide (ITO) and formed on the upper substrate 10. The metal bus electrodes (13Y and 13Z) are typically made of chrome (Cr) and formed on the transparent electrodes (12Y and 12Z), reducing voltage drop caused by the highly resistive transparent electrodes (12Y and 12Z).

Also, an upper dielectric layer 14 and a protective film 16 are layered on the upper substrate 10 on which the scan electrode (Y) and the sustain electrode (Z) are formed side by side. The charge particles formed by discharge (i.e. wall charge) are stacked on this upper dielectric layer 14. The protective film 16 protects the upper dielectric layer 14 from damages caused by sputtering during plasma discharge, and increases ejection rate of secondary electrons. Usually magnesium oxide (MgO) is used for the protective film 16.

On the lower substrate 18 on which the address electrode (X) is formed is a lower dielectric layer 22 and a barrier rib 24. Surfaces of the lower dielectric layer 22 and the barrier rib 24 are coated with a phosphor layer 26. The address electrode (X) is formed at right angles to the scan electrode (Y) and the sustain electrode (Z). The barrier rib 24 is formed in a strip or lattice pattern, and prevents ultraviolet rays and visible rays generated by discharge from leaking by an adjacent discharge cell. The phosphor layer 26 is excited by ultraviolet rays generated by plasma discharge, and generates one of visible rays in red, blue, or blue.

The mixed inert gas is injected to discharge space formed in between the upper/lower substrate 10, 18 and the barrier rib 24.

To obtain continuous-tone images, each frame of PDP is divided into a plurality of subfields with different frequencies of the radiation in time-sharing system. Each subfield is composed of three parts: a reset period for resetting the full screen, an address period for selecting a scan line and for selecting a cell among the selected scan line, and a sustain period for display images in gray scales according to the frequency of discharge.

For instance, suppose that an images needs to be displayed in 256 gray scales. Then, as shown in FIG. 2, a frame period (16.67 ms) corresponding to 1/60 sec is divided into 8 subfields (SF1 through SF8). As described above, each of these eight subfields (SF1 through SF8) is composed of three parts, namely the reset period, the address period, and the sustain period. The reset and address periods of each subfield are same for each subfield, but the sustain period of each subfield is exponentially increased at the rate of $2^n$ (n=0,1,2,3,4,5,6,7).

Moreover, a front filter is installed at the upper substrate 10 of the PDP, to shield electromagnetic wave and to prevent reflection of external light.

FIG. 3 is a cross-sectional view of one side of a related art PDP.

Referring to FIG. 3, the related art PDP includes a panel 32 for which an upper substrate and a lower substrate are tightly adhered to each other, a front filter 30 installed at the front surface of the panel 32, a heat radiation plate 34 installed at the rear surface of the panel 32, a printed circuit substrate 36 attached to the heat radiation plate 34, a back cover 38 for compassing the rear surface of the PDP, a filter supporting part 40 for connecting the front filter 30 to the back cover 38, and a bearing member 42 installed in between the front filter 30 and the back cover 38 to compass the filter supporting part 40.

The printed circuit substrate 36 sends actuation signals to the electrodes of the panel 32. To this end, the printed circuit substrate 36 is mounted with diverse driving parts that are not shown in FIG. 3. The panel 32, in response to the actuation signal provided from the printed circuit substrate 36, displays a desired image. The heat radiation plate 34 radiates heat generated from the panel 32 and the printed circuit substrate 36. The back cover 38 protects the panel 32 from external impacts, and blocks ElectroMagnetic Interference (hereinafter referred to as EMI) in the rear surface.

The filter supporting part 40 electrically connects the front filter 30 to the back cover 38. In other words, the filter supporting part 40 earths the front filter 30 to the back cover 38, and prevents an occurrence of EMI on the side. The bearing member 42 bears the filter supporting part 40, the front filter 30, and the back cover 38.

The front filter 30 not only shields EMI but also prevents the reflection of external light. To this end, as shown in FIG. 5, the front filter 30 includes an antireflection coating 50, an optical characteristic film 52, a glass 54, an EMI shielding film 56, and a near infrared rays (hereinafter referred to as NIR) blocking film 58. In reality, an adhesive intermediate film is formed in between adjacent films (50, 52, 54, 56, and 58) of the front filter 30. In addition, the optical characteristic film 52 is not usually an independent separate layer as shown in the drawing. Instead, the optical characteristic film 52 is formed by infusing a specific material to the adhesive intermediate film. The structure of the front filter 30 is slightly different, depending on which manufacturer produces the front filter. For the convenience of description of the invention, the adhesive intermediate film is not illustrated in the drawings. However, the optical characteristic film 52 is well illustrated as a separate layer, and the structure of the front filter 30 is the one currently being used in the PDP.

The antireflection coating 50 prevents the reflection of an incident light from outside and thus, improves contrast of images on the PDP. The antireflection coating 50 is formed on the surface of the front filter 30. In some cases, the antireflection coating 50 can be formed additionally on the rear surface of the front filter 30 as well. The optical characteristic film 52 reduces the brightnesses of red (R) and green (G) rays among incident light from the panel 32 but increases the brightness of blue (B) ray, thereby improving optical characteristics of the PDP.

The glass 54 protects the front filter 30 from external impacts. In other words, the glass 54 supports the front filter 30 in order to prevent the front filter 30 and the filter 32 from being damaged by external impacts.

The EMI shielding film 56 shields EMI, and prevents the ejection of EMI incidented from the panel 32 to the outside.

The NIR blocking film 58 blocks NIR radiation from the panel 32, and using an IR like a remote controller, it helps signal-transmitting devices to able to do their work as normally by preventing an excess of the ejection of NIR to the outside more than what is required.

In the meantime, the EMI shielding film 56 and the NIR blocking film 58 can be integrated together, instead of being separate layers.

Referring now to FIG. 5, the above described front filter 30 is electrically connected to the back cover 38 through the filter supporting part 40. To be more specific, the filter supporting part 40 is connected to the both components in such manner that it covers from one end of the front filter 30 to the rear surface of the front filter 30. Here, the filter supporting part 40 is electrically connected to at least one of the EMI shielding film 56 and the NIR blocking film 58. That is, by earthing the front filter 30 to the back cover 38, the filter supporting part 40 can shield the EMI and/or NIR effects.

Therefore, the glass 54 in the related art front filter 30 serves to protect the front filter 30 from external impacts. However, one of disadvantages of using the glass 54 is that the thickness of the front filter 30 with the glass 54 is increased. In addition, when the glass 54 is inserted to the front filter 30, total weight and cost of manufacture are increased.

To resolve the above problems, a film type front filter 60 without the glass 54 is newly introduced, as depicted in FIG. 6. The film type front filter 60 includes an antireflection coating 62, an optical characteristic film 64, an EMI shielding film 66, and an NIR blocking film 68. An adhesive intermediate layer is formed in between adjacent films 62, 64, 66, and 68 of the film type front filter 60 to adhere the films to one another. In general, the optical characteristic film 60 is not a separate layer, but formed by infusing a specific material to the adhesive intermediate layer. The structure of the front filter 60 is slightly different, depending on which manufacturer produces the front filter 60. For the convenience of description of the invention, the adhesive intermediate film is not illustrated in the drawings. However, the optical characteristic film 64 is shown as a separate layer.

The antireflection coating 62 is formed on the surface of the film type front filter 60, and prevents the reflection of an external incident light back to the outside. The optical characteristic film 64 dims down red (R) and green (G) rays among incident light from the panel 32 but increases the brightness of blue (B) ray, thereby improving optical characteristics of the PDP.

The EMI shielding film 66 shields EMI, and prevents the ejection of EMI incidented from the panel 32 to the outside. The EMI shielding film 66 can be integrated with the NIR blocking film 68 which will be discussed next.

The NIR blocking film 66 blocks the incidence of NIR from the panel 32. Here, NIR has a wavelength of 700–1200 nm, and is generated by Xe that emits 800–1000 nm rays during the discharge of mixed inert gases filled in the PDP panel. When the NIR is ejected to the outside, signal-transmitting devices like a remote controller for transmitting signals via IR do not work. As a result, signals cannot be transmitted to the PDP any more. That is to say, the ejection of the NIR causes malfunction of the remote controller. Hence, the NIR blocking film 68 made of NIR absorbing materials (or colorant) prevents an excess of the ejection of NIR to the outside more than what is required, to ensure that signals from the remote controller for example are properly transmitted to the panel 32.

The merits of the film type front filter 60 are that the film type front filter without the glass 54 is lighter and thinner than the front filter with the glass 54. Also, the film type front filter 60 can reduce cost of manufacture by not using the glass 54.

On the other hand, FIG. 7 shows a representative light transmittance curve achieved with the related art film type front filter 60 and the related art front filter 30 including the glass 54. Even though the transmittance of such front filters is influenced by what kind of colorant is infused to each functional layer of the front filter and what kind of materials the functional layers are made of, it is more heavily influenced by transmittance curve design for determining transmittance of the front filter.

Referring to FIG. 7, transmittance of orange rays at a wavelength of 580–592nm of the front filters 30 and 60 according to the related art is already close to 40%, and thus, color purity of the PDP displaying images in R, G, and B colors is severely degraded. For instance, when it is necessary to express a white color using R, G, and B colors, a yellowish white is displayed instead, or it is sometimes difficult to express flesh color.

Furthermore, transmittance of green (G) rays 72 at a wavelength of 525 nm is too much lower than transmittance of blue (B) rays 71 or red (R) rays 74.

Also, transmittance of NIR 75 causing malfunction of the remote controller is as much as 5–10%.

Therefore, there is a growing need for improvement of transmittance design of the front filter.

SUMMARY OF THE INVENTION

An object of the invention is to solve at least the above problems and/or disadvantages and to provide at least the advantages described hereinafter.

Accordingly, one object of the present invention is to solve the foregoing problems by providing a front filter having an ideal transmittance curve.

The foregoing and other objects and advantages are realized by providing a front filter a front filter attached to a front surface of a plasma display panel, the front filter comprising: an antireflection coating for preventing reflection of incident light from outside; an optical characteristic film for improving optical characteristics of incident light from the panel, by decreasing brightnesses of red (R) and green (G) rays and by increasing brightness of blue (B) rays; an EMI shielding film for shielding emission of electromagnetic wave; and an NIR blocking film for blocking near infrared rays emitted from the panel, wherein, transmittance of emitted light from the plasma display panel when the emitted light transmits the antireflection coating, the optical characteristic film, the EMI shielding film, and the NIR blocking film is determined in dependence of wavelength of the emitted light, and wherein transmittance of B rays at a wavelength of 454 nm is 50–80%, transmittance of G rays at a wavelength of 525 nm is 40–80%, transmittance of orange rays at a wavelength of 580–592 nm is 5–30%, transmittance of R rays at a wavelength of 610–630 nm is 50–80%; and transmittance of NIR at a wavelength of 850–950 nm is 1–10%.

Another aspect of the invention provides a front filter attached to a front surface of a plasma display panel, the front filter comprising: an antireflection coating for preventing reflection of incident light from outside; an optical characteristic film for improving optical characteristics of incident light from the panel, by decreasing brightnesses of red (R) and green (G) rays and by increasing brightness of blue (B) rays; an EMI shielding film for shielding emission of electromagnetic wave; and an NIR blocking film for blocking near infrared rays emitted from the panel, wherein, transmittance of emitted light from the plasma display panel when the emitted light transmits the antireflection coating, the optical characteristic film, the EMI shielding film, and the NIR blocking film is determined in dependence of wavelength of the emitted light, and wherein transmittance of B rays at a wavelength of 454 nm is 60–70%, transmittance of G rays at a wavelength of 525 nm is 60–70%, transmittance of orange rays at a wavelength of 580–592 nm is 5–20%, transmittance of R rays at a wavelength of 610–630 nm is 60–70%, and transmittance of NIR at a wavelength of 850–950 nm is 1–5%.

In an exemplary embodiment of the invention, the front filter further comprises a glass for protecting the front filter and the panel from external impacts.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a front filter in a plasma display panel according to a preferred embodiment of the invention in reference to the accompanying drawings.

Figure 1:
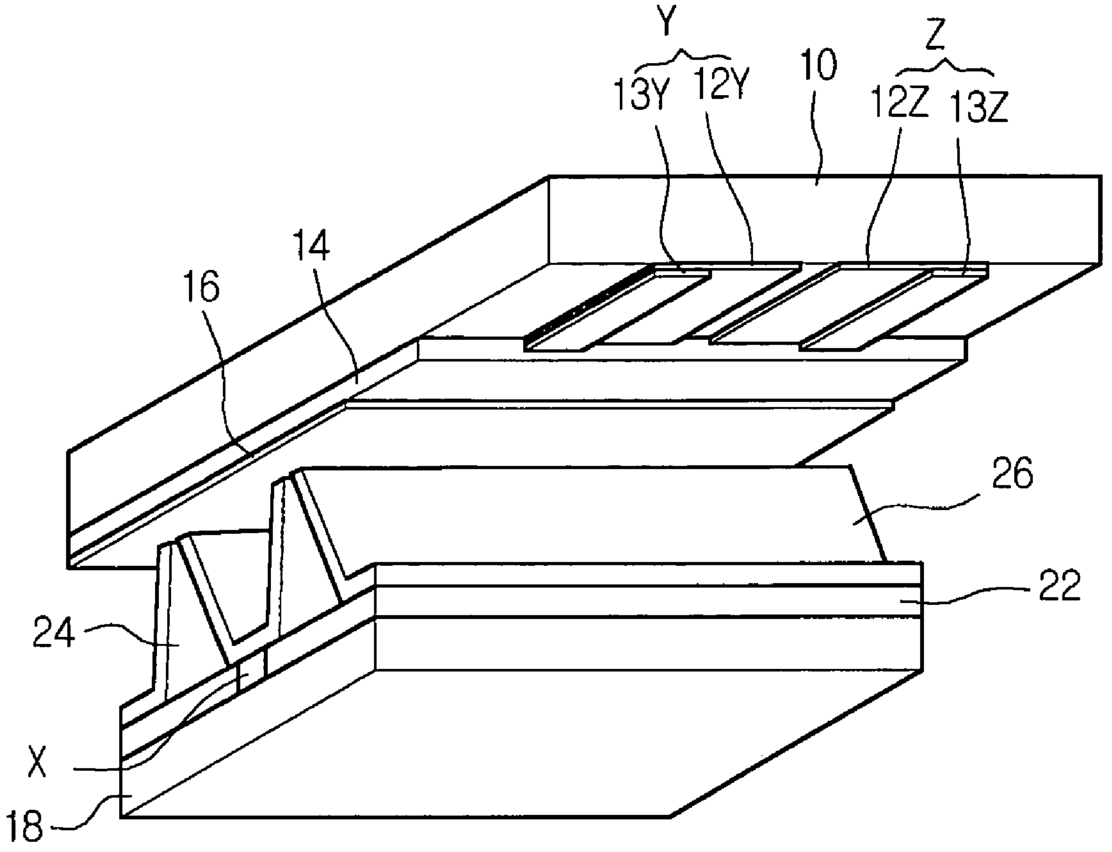
Fig.1 Related Art
FIG. 1 is a perspective view of the structure of a discharge cell in a related art PDP.
Figure 2:
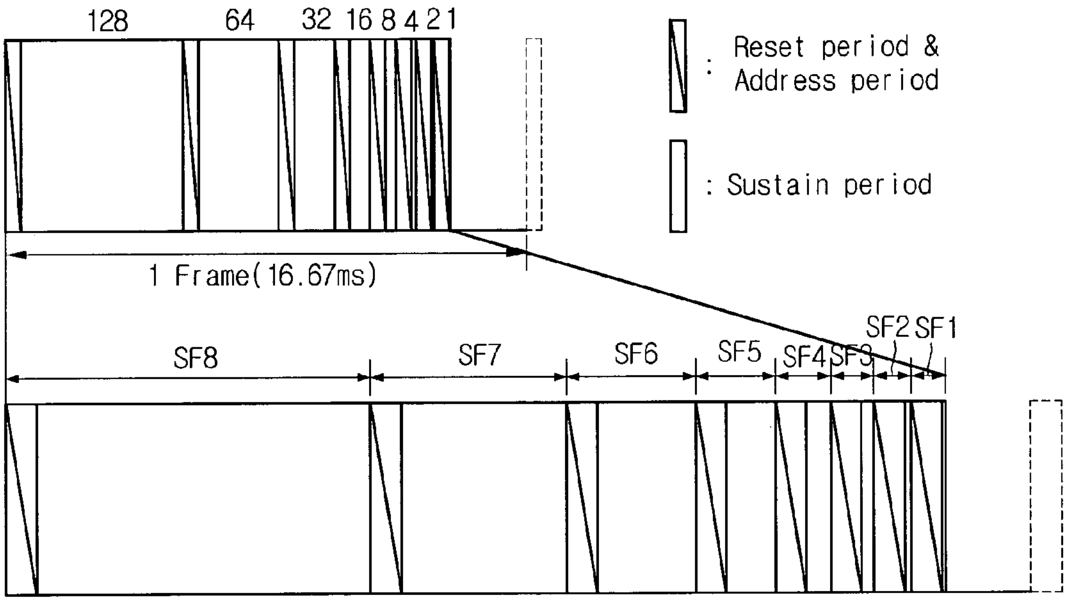
Fig.2 Related Art
FIG. 2 illustrates a frame in 256 gray scales for used in a related art plasma display panel.
Figure 3:
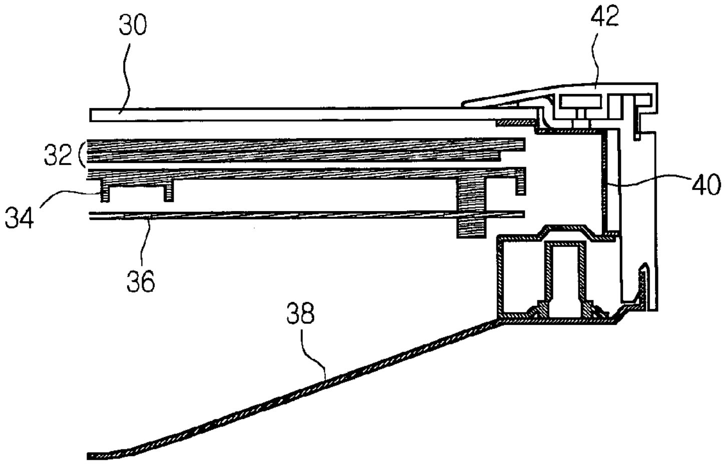
Fig.3 Related Art
FIG. 3 is a cross-sectional view of one side of a related art PDP.
Figure 4:
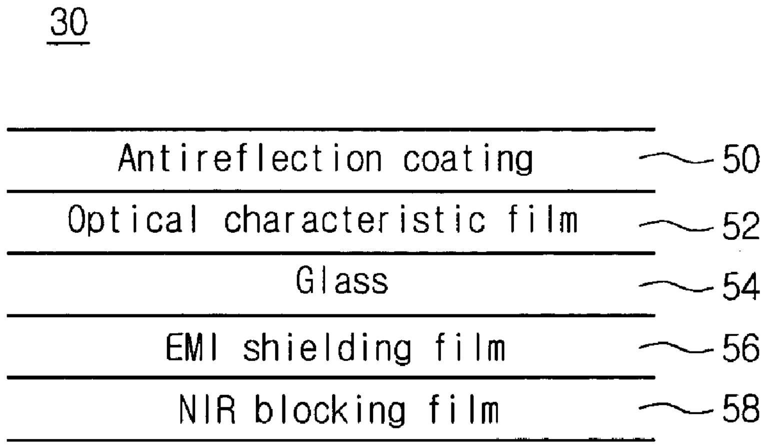
Fig.4 Related Art
FIG. 4 is a cross-sectional view of the front filter in FIG. 3.
Figure 5:
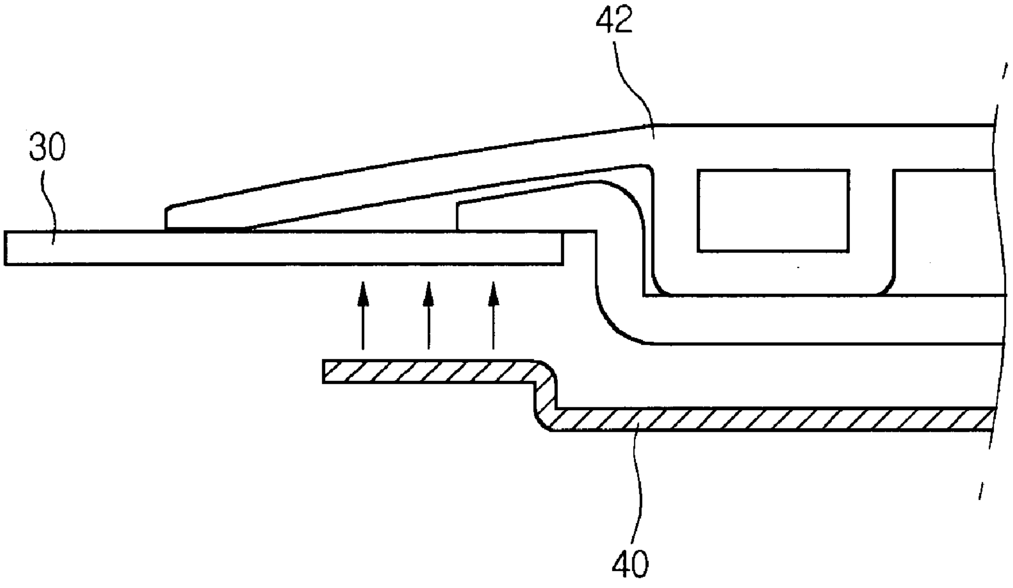
Fig.5 Related Art
FIG. 5 is a detailed exploded view illustrating an earthing process on the front filter in FIG. 3 and a filter supporting part.
Figure 6:
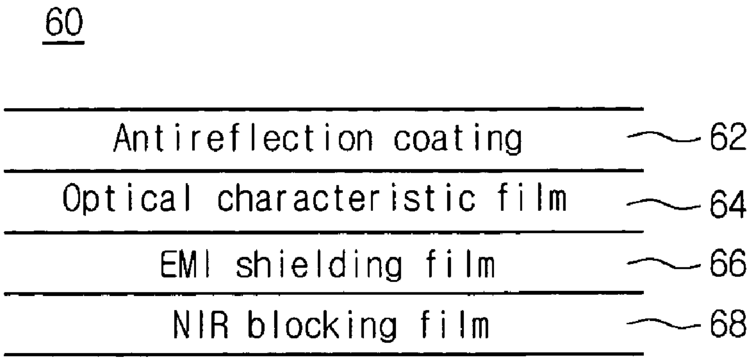
Fig.6 Related Art
FIG. 6 is a cross-sectional view of a related art film type front filter.
Figure 7:
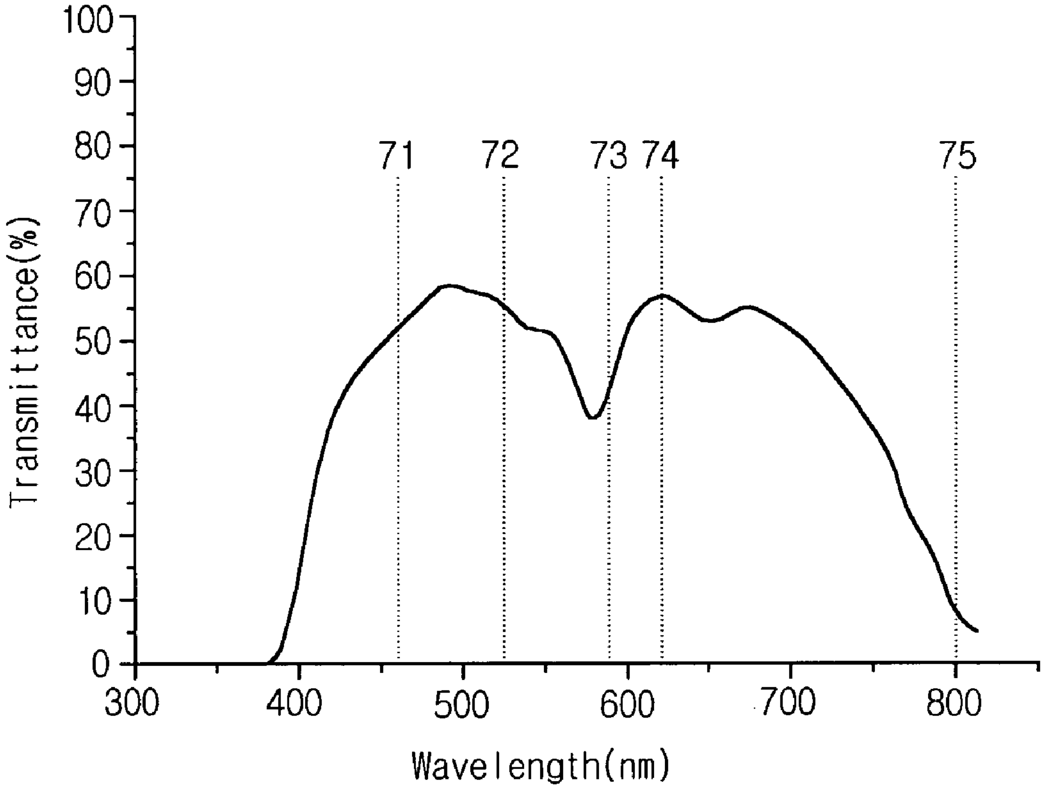
Fig.7 Related Art
FIG. 7 illustrates a transmittance curve achieved with a related art front filter.
Figure 8:
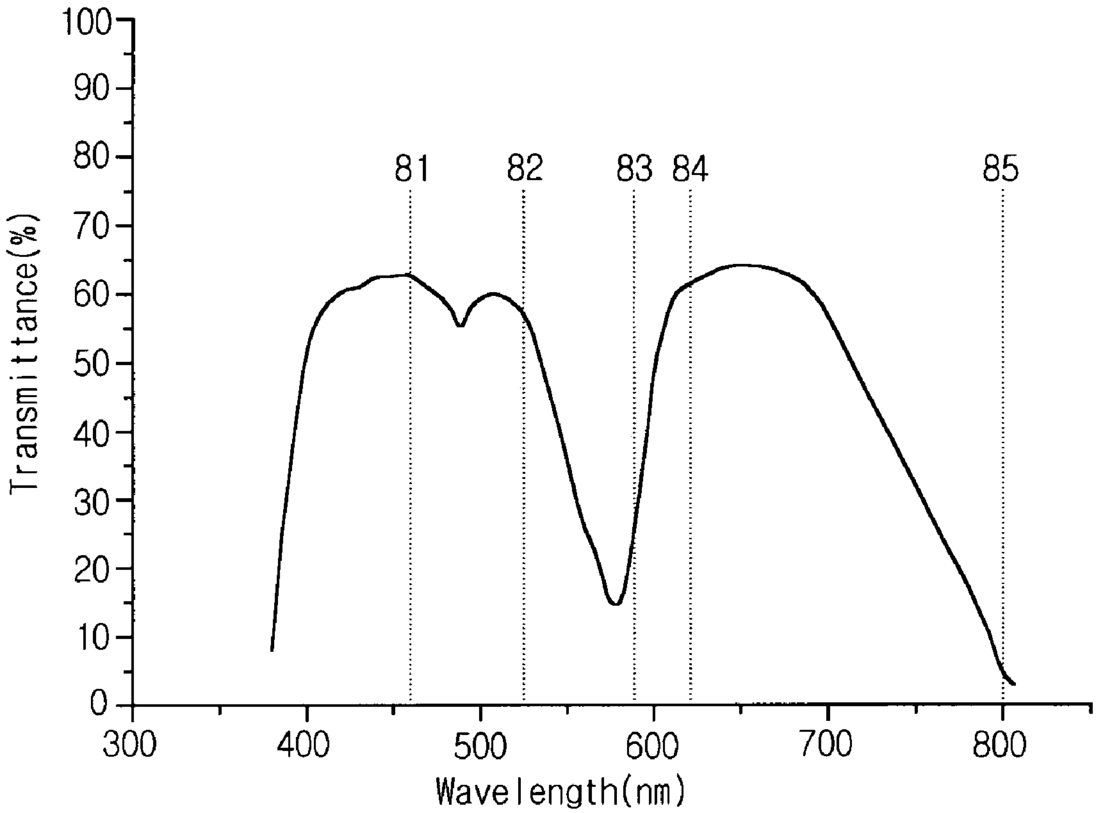
FIG. 8 illustrates a transmittance curve achieved with a front filter in accordance with a first preferred embodiment of the present invention.

FIG. 8 illustrates a transmittance curve achieved with a front filter in a PDP according to a first preferred embodiment of the present invention.

Similar to the structure of a related art front filter, the front filter of the invention includes an antireflection coating, an optical characteristic film, a glass, an EMI shielding film, and an NIR blocking film. If desired, the glass can be removed. The optical characteristic film and the NIR blocking film are not separate layers, and an adhesive intermediate layer having a specific material is formed in between them.

Although transmittance of the front filter is influenced by what kind of colorant is infused to each functional layer of the front filter and what kind of materials the functional layers are made of, it is more heavily influenced by transmittance curve designing for determining transmittance of the front filter.

Referring to the transmittance curve shown in FIG. 8, which is achieved with the front filter according to the first embodiment of the invention, transmittance of B rays 81 at a wavelength of 454 nm is 50–80%, transmittance of G rays 82 at a wavelength of 525 nm is 40–80%, transmittance of orange rays 83 at a wavelength of 580–592 nm is 5–30%, transmittance of R rays 84 at a wavelength of 610–630 nm is 50–80%, and transmittance of NIR 85 at a wavelength of 850–950 nm is 1–10%.

Compared to transmittance achieved with a related art front filter, the transmittance of G rays 82 has been increased considerably by 20% to 30%, resulting in a remarkable increase of color temperature, and the transmittance of orange rays 83 has been reduced by 20–30%, resulting in a remarkable increased of color purity. Besides, by designing the transmittance curve to have an increased slope at the NIR 85 wavelength range, manufacturers can greatly reduce the transmittance of NIR 85 that is known to cause malfunction of a remote controller.

Therefore, the front filter according to the first embodiment of the invention shows an ideal light transmittance curve, generating effects like improvement of color purity of the PDP and increases of contrast and color temperature.

Figure 9:
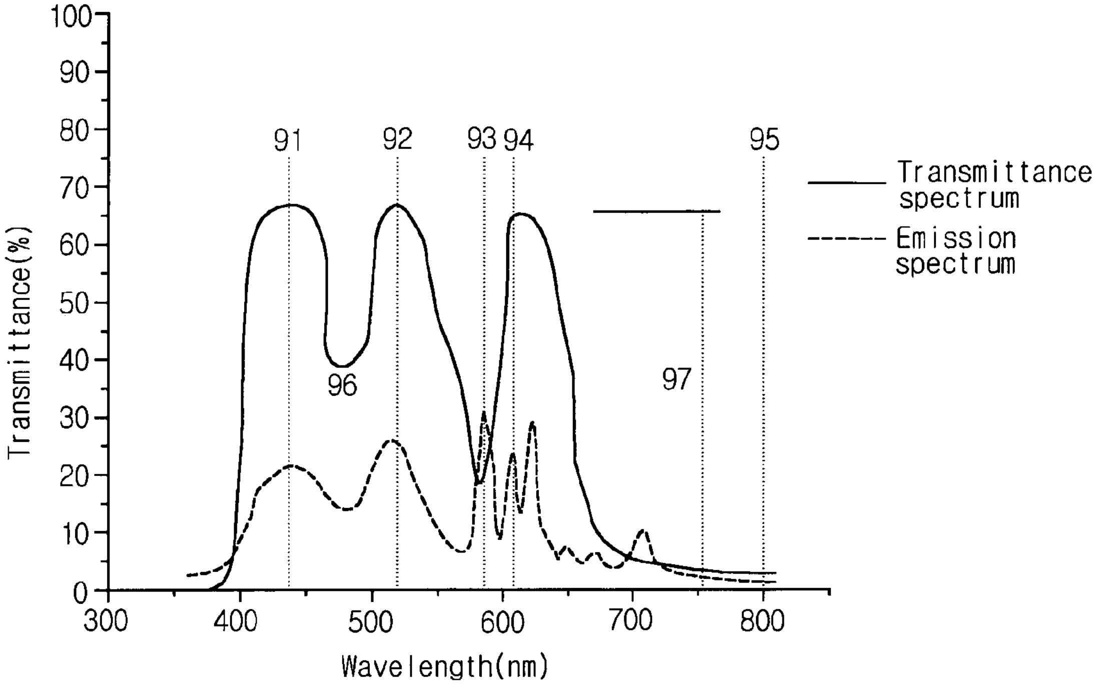
FIG. 9 illustrates a transmittance curve achieved with a front filter in accordance with a second preferred embodiment of the present invention.

FIG. 9 illustrates a transmittance curve achieved with a front filter in a PDP according to a second preferred embodiment of the present invention.

In FIG. 9, a solid line indicates a spectral transmittance curve, and a dotted line indicates a spectral emission curve obtained from light emission from the PDP.

Referring to the transmittance curve shown in FIG. 9, which is achieved with the front filter according to the second embodiment of the invention, transmittance of B rays 91 at a wavelength of 454 nm is 60–70%, transmittance of G rays 92 at a wavelength of 525 nm is 60–70%, transmittance of orange rays 93 at a wavelength of 580–592 nm is 5–20%, transmittance of R rays 94 at a wavelength of 610–630 nm is 60–70%, and transmittance of NIR 95 at a wavelength of 850–950 nm is 1–5%.

In FIG. 9, a sharp absorption peak 96 is formed at 480–500 nm between the G rays 92 and the R rays 94, and as a result thereof, the difference between the transmittances of B rays 91 and G rays 92 and the transmittance at the wavelength range with the absorption peak 96 is 10–20%.

Also, when a sharp absorption peak 96 is formed at 580–600 nm between the G rays 92 and the R rays 94, the difference between the transmittances of B rays 91 and G rays 92 and the transmittance at the wavelength range with the absorption peak 96 is 10–50%.

To achieve a noticeable reduction in NIR 95 transmission, a sharp NIR absorption peak 97 can be formed at a wavelength of 640–700 nm, causing the transmittance difference between the R rays 95 and the NIR 95 is 1–70%.

Compared to transmittance achieved with a related art front filter, the transmittance of G rays 92 has been increased considerably by 20% to 30%, resulting in a remarkable increase of color temperature, and the transmittance of orange rays 93 has been reduced by 20–30%, resulting in a remarkable increased of color purity. Besides, by designing the transmittance curve to have an increased slope at the NIR 95 wavelength range, manufacturers can greatly reduce the transmittance of the NIR 95 that is known to cause malfunction of a remote controller.

When the absorption peak 96 between the B rays 91 and the G rays 92 is at 480–500 nm, light transmittance at a wavelength range where color purity of rays is low is noticeably reduced, and color purities of the B rays and G rays are improved.

Therefore, the front filter according to the second embodiment of the invention transmits only rays from a certain wavelength range where color purities of R, G and B rays are high.

Moreover, color contrast effect can be increased by reducing transmittance of other colored rays at different wavelength ranges from the wavelength ranges transmitting three-color rays emitted from PDP phosphors.

In conclusion, color purity of the PDP can be improved by manufacturing the front filter to have the ideal light transmittance curve.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A front filter attached to a front surface of a plasma display panel, the front filter comprising:

an antireflection coating for preventing reflection of incident light from outside;

an optical characteristic film for improving optical characteristics of incident light from the panel;

an EMI shielding film for shielding emission of electromagnetic wave; and an NIR blocking film for blocking near infrared rays emitted from the panel, wherein transmittance of emitted light from the plasma display panel when the emitted light traverses the antireflection coating, the optical characteristic film, the EMI shielding film, and the NIR blocking film is determined independent of wavelength of the emitted light, wherein transmittance of blue rays at a wavelength of 454 nm is 50–80%, transmittance of green rays at a wavelength of 525 nm is 40–80%, transmittance of orange rays at a wavelength of 580–592 nm is 5–20%, transmittance of red rays at a wavelength of 610–630 nm is 50–80%, and transmittance of near infrared rays at a wavelength of 850–950 nm is 1–5%, and wherein light transmittance at a wavelength range between the blue rays and the green rays is less than light transmittances of the blue rays and green rays by 1–20%, light transmittance at a wavelength range between the green rays and the red rays is less than light transmittances of the green rays and red rays by 10–50% and light transmittance at a wavelength range between the red rays and the near infrared rays is less than light transmittances of the red rays and near infrared rays by 1–70%.

2. The front filter according to claim 1, wherein the front filter further comprises a glass for protecting the front filter and the panel from external impacts.

3. The front filter according to claim 1, wherein an absorption peak of rays between the blue rays and the green rays is formed at a wavelength ranging from 480 nm to 500 nm; an absorption peak of rays between the green rays and the red rays is formed at a wavelength range from 580 nm to 600 nm and an absorption peak of rays between the red rays and the near infrared rays is formed at a wavelength range from 640 nm to 700 nm.

4. A front filter characterized of a light transmittance curve, in which transmittance of blue rays at 454 nm ranges from 50% to 80%; transmittance of green rays at 525 nm ranges from 40% to 80%; transmittance of orange rays at a wavelength range of 580–592 nm ranges from 5% to 30%; transmittance of red rays at a wavelength range of 610–630 nm ranges from 50% to 80%; and transmittance of near infrared rays at a wavelength range of 850–950 nm ranges from 1% to 10% wherein light transmittance at a wavelength range between the blue rays and the green rays is less than light transmittances of the blue rays and green rays by 1–20%, light transmittance at a wavelength range between the green rays and the red rays is less than light transmittances of the green rays and red rays by 10–50% and light transmittance at a wavelength range between the red rays and the near infrared rays is less than light transmittances of the red rays and near infrared rays by 1–70%.

5. A front filter characterized of a light transmittance curve, in which transmittance of blue rays at 454 nm ranges from 50% to 60%; transmittance of green rays at 525 nm ranges from 40% to 60%; transmittance of orange rays at a wavelength range of 580–592 nm ranges from 5% to 30%; transmittance of red rays at a wavelength range of 610–630 nm ranges from 50% to 60%; and transmittance of near infrared rays at a wavelength range of 850–950 nm ranges from 1% to 10% wherein light transmittance at a wavelength range between the blue rays and the green rays is less than light transmittances of the blue rays and green rays by 1–20%, light transmittance at a wavelength range between the green rays and the red rays is less than light transmittances of the green rays and red rays by 10–50% and light transmittance at a wavelength range between the red rays and the near infrared rays is less than light transmittances of the red rays and near infrared rays by 1–70%.

6. The front filter according to claim 5, wherein an absorption peak of rays between the blue rays and the green rays is formed at a wavelength ranging from 480 nm to 500 nm; an absorption peak of rays between the green rays and the red rays is formed at a wavelength range from 580 nm to 600 nm; and an absorption peak of rays between the red rays and the near infrared rays is formed at a wavelength range from 640 nm to 700 nm.

7. A front filter attached to a front surface of a plasma display panel, the front filter comprising:

an optical characteristic film for improving optical characteristics of incident light from the panel; and an NIR blocking film for blocking near infrared rays emitted from the panel, wherein transmittance of emitted light from the plasma display panel when the emitted light transmits the optical characteristic film and the NIR blocking film is determined in dependence of wavelength of the emitted light, wherein transmittance of blue rays is 50–80%, transmittance of green rays is 40–80%, transmittance of orange rays is 5–30%, transmittance of red rays is 50–80%, and transmittance of near infrared ray is 1–10% and wherein light transmittance at a wavelength range between the blue rays and the green rays is less than light transmittances of the blue rays and green rays by 1–20%. light transmittance at a wavelength range between the green rays and the red rays is less than light transmittances of the green rays and red rays by 10–50% and light transmittance at a wavelength range between the red rays and the near infrared rays is less than light transmittances of the red rays and near infrared rays by 1–70%.

8. The front filter according to claim 7, the front filter further comprising:

an antireflection coating for preventing reflection of incident light from outside.

9. The front filter according to claim 7, the front filter further comprising:

an EMI shielding film for shielding emission of electromagnetic wave.

10. The front filter according to claim 7, wherein the front filter further comprises a glass for protecting the front filter and the panel from external impacts.

11. The front filter according to claim 7, wherein a wavelength of the blue rays is 454 nm.

12. The front filter according to claim 7, wherein a wavelength of the green rays is 525 nm.

13. The front filter according to claim 7, wherein a wavelength of the red rays is 610~630 nm.

14. The front filter according to claim 7, wherein a wavelength of the orange rays is 580~592 nm.

15. The front filter according to claim 7, wherein a wavelength of the near infrared rays is 850~950 nm.

16. The front filter according to claim 7, wherein the wavelength range between the blue rays and the green rays is 480~nm.

17. The front filter according to claim 7, wherein the wavelength range between the green rays and the red rays is 580~600 nm.

18. The front filter according to claim 7, wherein the wavelength range between the red rays and the near infrared rays is 640~700 nm.

* * * * *